Dec. 8, 1936.  F. ALOE  2,063,535
AUTOMOBILE TIRE CHAIN
Filed Oct. 18, 1935
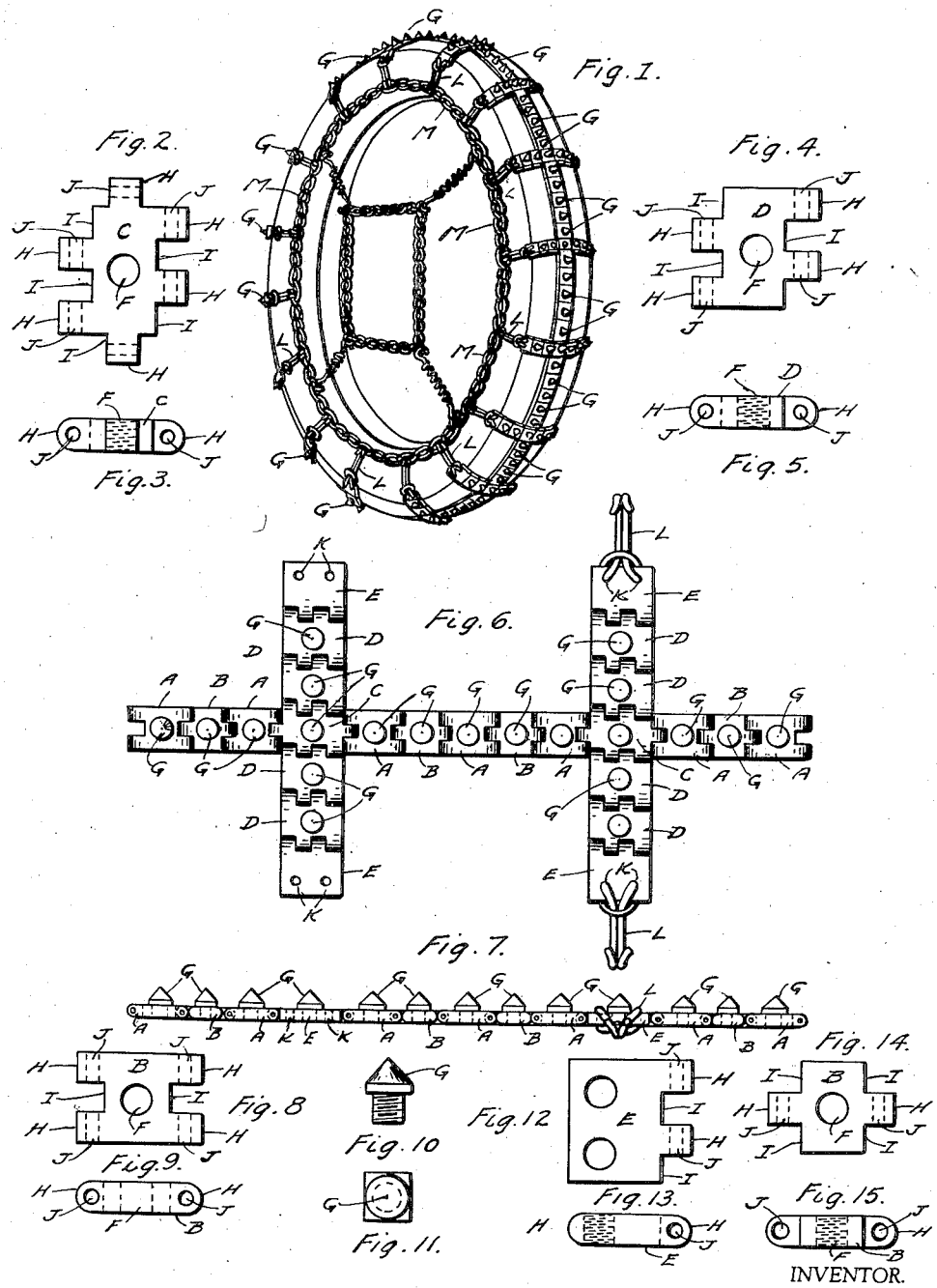
INVENTOR.
Frank Aloe
BY
Mark M. Decker
ATTORNEY.

Patented Dec. 8, 1936

2,063,535

UNITED STATES PATENT OFFICE 2,063,535

AUTOMOBILE TIRE CHAIN

Frank Aloe, Washington, Pa.

Application October 18, 1935, Serial No. 45,574

1 Claim. (Cl. 152—14)

My invention relates to tire-chains and has for its object to provide an automobile tire-chain which will be entirely efficient in its working, easy to operate and cheap to manufacture.

The invention consists of certain novel features and details of construction as will be more fully described hereinafter and finally pointed out in the claim.

I will now describe my invention, reference being had to the accompanying drawing, in which similar letters of reference indicate corresponding parts in the several figures, and in which, Figure 1 is a perspective view of an automobile tire, showing my improved chain attached thereto.

Fig. 2 is a plan view of the connecting link employed between the circumferential chain and the cross-chains.

Fig. 3 is a side elevation of the same.

Fig. 4 is a detail plan view of one of the intermediate links employed in the cross-chains.

Fig. 5 is a side elevation of the same.

Fig. 6 is a plan view of a section of my improved chain assembly.

Fig. 7 is a side elevation of the arrangement as shown in Fig. 6.

Fig. 8 is a plan view of one of the sections used in the circumferential chain.

Fig. 9 is a side elevation of the same.

Fig. 10 is a side elevation of one of my improved cone-shaped spikes used in the construction of my improved chain.

Fig. 11 is a plan view of the same.

Fig. 12 is a detail plan view of the outer section of the cross-chains.

Fig. 13 is a side elevation of the same.

Fig. 14 is a plan view of a section employed in the circumferential chain, and Fig. 15 is a side elevation thereof.

I will now describe the assembly or construction of my invention, which is as follows:

The chain proper is formed of several interchangeable sections of different configurations, adapted to be secured together by means of bolts, screws or rivets and so arranged as to form a circumferential chain and cross-chains combined.

The circumferential chain is constructed of several different sections and is held in position by the cross-chains which causes it to ride on the outer periphery of the tire, so that the chain proper not only has traction forward and backward but sidewise as well, giving the tires additional traction or gripping surface, other than that secured by the ordinary tire-chains.

The chain is formed of several sections A, B, C, D, and E, each of which is provided with holes F, which may be plain or threaded for receiving the stems of bevel-pointed spikes G, which stems may be plain or threaded to correspond with the holes F.

The several sections A, B, C, D and E, are formed with lugs H, and recesses I, and are also provided with holes J for the purpose of receiving bolts, screws or rivets for securing the several sections together.

The sections E, of the cross-chains are provided with two additional holes K, for receiving a connecting link L, which connects the cross-chains with the side chains M.

As many cross-chains may be used in forming my improved tire-chain as may be desired or necessary to properly distribute them around the circumference of the tire.

When the spikes G, of the chain become worn down, they may be readily removed from the several sections and replaced by new ones, thereby keeping the chain proper, in perfect condition.

By the use of my improved chain, the danger of skidding on snow, ice or muddy roads is practically overcome, and a perfect traction is afforded at all times.

Having described my invention what I claim and desire to secure by Letters Patent is:

A tire chain including side chains, a circumferential tread chain and cross chains, the circumferential tread chain being substantially centrally disposed with respect to the side chains and the cross chains being spaced apart and having their ends and mid sections attached to the cross chains and circumferential chain, respectively, the circumferential tread chain comprising mating links consisting of a series of links having centrally disposed projections on opposite sides thereof and a series of links having centrally disposed recesses on opposite sides thereof, said projections of one series entering the recesses of the other series in alternate relation and secured thereto, the cross chains consisting of a plurality of intermediate and end links, the outer edges of which links are in a straight line and a centrally disposed link in the cross chain connected with the links of the circumferential chain, the centrally disposed link of the cross chain having centrally arranged projections on opposite ends thereof, said projections adapted to enter the recesses of the circumferential links for securing the circumferential chain to the cross chains, the centrally disposed link in the cross chain also having a pair of spaced projections and a pair of spaced recesses on opposite sides thereof, the projections on either side located in offset relation to the edge of the end of the link in opposite directions to render the link reversible and interchangeable, the intermediate links of the cross chain having at opposite sides thereof spaced projections and recesses similarly related to each other as in the centrally disposed link, and means for connecting the end links of the cross chain to the side chains.

FRANK ALOE.